US011731281B2

(12) United States Patent
Abdelkader et al.

(10) Patent No.: US 11,731,281 B2
(45) Date of Patent: Aug. 22, 2023

(54) AUTOMATION IN A ROBOTIC PIPE COATING SYSTEM

(71) Applicant: Saudi Arabian Oil Company, Dhahran (SA)

(72) Inventors: Mohamed Abdelkader, Thuwal (SA); Sahejad Patel, Thuwal (SA); Hassane Trigui, Thuwal (SA); Brian Parrott, Thuwal (SA); Abdoulelah Al-Hannabi, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 357 days.

(21) Appl. No.: 16/919,206

(22) Filed: Jul. 2, 2020

(65) Prior Publication Data
US 2022/0001548 A1 Jan. 6, 2022

(51) Int. Cl.
*B05C 7/08* (2006.01)
*B05C 11/10* (2006.01)
(Continued)

(52) U.S. Cl.
CPC ............ *B25J 11/0075* (2013.01); *B05C 7/08* (2013.01); *B05C 11/1034* (2013.01);
(Continued)

(58) Field of Classification Search
USPC ................ 118/323, 321, 712, 713, 306, 317, 118/679–681
See application file for complete search history.

(56) References Cited

U.S. PATENT DOCUMENTS

| 5,565,633 A | 10/1996 | Wernicke |
| 8,633,713 B2 | 1/2014 | Langley et al. |

(Continued)

FOREIGN PATENT DOCUMENTS

| CN | 103316817 A | 9/2013 |
| CN | 107817509 A | 3/2018 |

(Continued)

OTHER PUBLICATIONS

International Search Report & Written Opinion, Counterpart PCT Application No. PCT/US21/38576; dated Oct. 15, 2021.

*Primary Examiner* — Yewebdar T Tadesse
(74) *Attorney, Agent, or Firm* — Leason Ellis LLP

(57) ABSTRACT

An automated system for performing multiple operations on one or more weld joints of a pipe string includes a main controller including a user interface; and a first robotic device that is in communication with the main controller and is configured to controllably travel inside of the pipe string and detect and uniquely identify each weld joint within the pipe string based on a vision-based weld detection module that is executed on a first onboard computer. The vision-based weld detection module provides at least one of: (1) images captured within the pipe string and (2) a live video feed within the pipe string that is displayed on the user interface for allowing a user to review and approve detection of the weld joint, whereupon once the user confirms the approval, the first robotic device automatically positions itself a predefined distance from the detected weld joint and automatically begins to perform at least one operation on the weld joint.

20 Claims, 13 Drawing Sheets

(51) Int. Cl.
  *B25J 11/00* (2006.01)
  *G06T 7/70* (2017.01)
  *G06V 20/10* (2022.01)
  *B05C 21/00* (2006.01)
  *B25J 5/00* (2006.01)
  *B25J 13/08* (2006.01)
  *F16L 55/18* (2006.01)
  *G06T 7/00* (2017.01)
  *F16L 55/48* (2006.01)
  *F16L 55/32* (2006.01)
  *F16L 101/16* (2006.01)
  *F16L 101/30* (2006.01)

(52) U.S. Cl.
  CPC ............... *B05C 21/00* (2013.01); *B25J 5/007* (2013.01); *B25J 13/089* (2013.01); *F16L 55/18* (2013.01); *F16L 55/32* (2013.01); *F16L 55/48* (2013.01); *G06T 7/0004* (2013.01); *G06T 7/70* (2017.01); *G06V 20/10* (2022.01); *F16L 2101/16* (2013.01); *F16L 2101/30* (2013.01); *G06T 2207/30152* (2013.01)

(56) References Cited

U.S. PATENT DOCUMENTS

| | | | |
|---|---|---|---|
| 8,800,396 | B2 | 12/2014 | Langley et al. |
| 2013/0014598 | A1 | 1/2013 | Langley et al. |
| 2016/0125592 | A1* | 5/2016 | Becker ............... B23K 37/0435 348/90 |
| 2020/0063906 | A1* | 2/2020 | Kamiyama ............. F16L 55/18 |

FOREIGN PATENT DOCUMENTS

| | | |
|---|---|---|
| CN | 108916531 A | 11/2018 |
| WO | 20180136769 A1 | 7/2018 |

* cited by examiner

AUTOMATION IN A ROBOTIC PIPE COATING SYSTEM

TECHNICAL FIELD

The present disclosure is directed to in-pipe processing technology and more particularly, relates to a mobile robotic system that performs weld inspection, surface preparation, coating and coating inspection inside of a pipe. The automated mobile robotic system allows for optimized deployment of the robotic devices that perform the various tasks required for coating pipes in the field. Not only is a direct labor reduction achieved through the present automation, but optimal deployment realizes reductions in cost, time, and capital requirements as well as performing tasks with more precision. In particular, the automated system and method are configured for accurately localizing a holiday found in the in-pipe coating and recoating only the defected area as opposed to the traditional technique of recoating the whole circular surface which includes it. This can result in redundant consumption of coating material especially for large surface areas in large pipes.

BACKGROUND

Metallic (e.g., carbon steel) pipelines are generally assembled in the field using girth welding techniques. Traditionally, pipes are delivered to the construction (installation) site in 12 meter sections that are pre-coated both internally and externally, except at the joint locations. These pipe sections are then welded together in the field (field girth welding) to form pipe strings of hundreds of meters.

This involves the welding together of abutting pipe ends with the weld bead protruding into the interior of the pipe, filling the entire gap between the abutting ends, and extending to a weld bead head on the outside of the joint around the entire girth of the weld. Upon completion of the girth welds, the welded joint and the surrounding surface of the pipe area must be coated to prevent corrosion at the joint. In such cases, robotic crawlers are used to reach the internal girth welds inside pipe strings of hundreds of meters to perform the coating task. The in-pipe girth weld coating process is a very complicated mission that requires multiple subtasks to be performed in succession.

As mentioned, as part of the assemble process, a robotic device is introduced into the inside of the pipeline in order to perform certain operations. More specifically, the current in-pipe coating robot technology primarily utilizes a train of robotic modules that each perform the tasks of grinding, surface preparation, coating, and. Another approach that is also utilized is to have an individual robot for each of the coating related tasks and insert them one at a time into the pipe to prepare and coat the pipe. In either configuration, the system is controlled manually by a human operator. For example, to perform surface preparation of the weld joint for coating, the operator drives and positions the robot manually with respect to the weld's area of interest, using visual feedback from an onboard camera. After the task is completed, the operator has to manually position the coating robot, or module, with respect to the same weld area that was prepared. Similarly, in the coating inspection task, the dry film thickness (DFT) and holidays modules are manually controlled by the operator, while visually monitored by a camera, in order to collect the measurements. Such manual operations require an experienced and skilled operator which knows the standard procedures with the adequate execution precision in timely manner.

SUMMARY

In one aspect, an automated system is provided for performing multiple operations on one or more weld joints of a pipe string that are detected by the system. The automated system includes a first robotic device that is configured to controllably travel inside of the pipe string and detect and uniquely identify each weld joint within the pipe string. The first robotic device includes an automated coating nozzle that is configured to coat one or more weld joints of the pipe string. The automated coating nozzle is operatively coupled to a first position detection mechanism for detecting a position of the automated coating nozzle.

The system further includes a second robotic device that is configured to controllably travel inside of the pipe string and includes an automated coating inspection tool for inspecting the coating on the weld joint. The automated inspection tool includes a second position detection mechanism for detecting a position of the coating inspection tool, thereby allowing a location of an anomaly in the coating to be determined.

The system further includes a main controller for controlling movement of the system and for positioning the automated coating nozzle based on position measurements from the second positioning mechanism at a location that allows localized recoating of the anomaly contained in the coating.

BRIEF DESCRIPTION OF DRAWING FIGURES

DETAILED DESCRIPTION OF CERTAIN EMBODIMENTS

Broadly speaking, the present disclosure is directed in-pipe processing technology and more particularly, relates to a mobile robotic system that performs weld inspection, surface preparation, coating and/or coating inspection inside of the pipe. The automated mobile robotic system allows for optimized deployment of the robotic devices that perform the various tasks required for coating pipes in the field. Not only is a direct labor reduction achieved through the present automation, but optimal deployment realizes reductions in cost, time, and capital requirements as well as performing tasks with more precision.

More specifically and according to one embodiment, the automated system and method are configured for accurately localizing a holiday found in the in-pipe coating and recoating only the defected area as opposed to the traditional technique of recoating the whole circular surface which includes it. This can result in redundant consumption of coating material especially for large surface areas in large pipes. The present system overcomes these deficiencies and provides a solution that optimizes the coating process and the amount of coating material that is required for the repair.

The present system also is configured to perform a number of other autonomous operations including but not limited to the following: (1) autonomous of the weld bead depth measurement and scanning; (2) autonomy of weld bead depth grinding rectification; (3) autonomy of weld surface preparation and blasting; and (4) autonomy of roughness measurements. Each of these operations is discussed below.

FIGS. 1-13 illustrate an exemplary automated mobile robotic system 100 that is configured to drive within a pipe 10 and perform a multitude of operations as described herein. In one embodiment, the system 100 first locates the weld joint and then automatically positions itself relative to the weld joint and then performs a coating inspection operation, such as a holiday detection operation, to detect a holiday and then precisely identify its location along the weld joint and then subsequently recoat this area at which the holiday was detected. As described herein, additional processing can be performed by the system 100 such as surface preparation of the weld joint.

Figure 2:
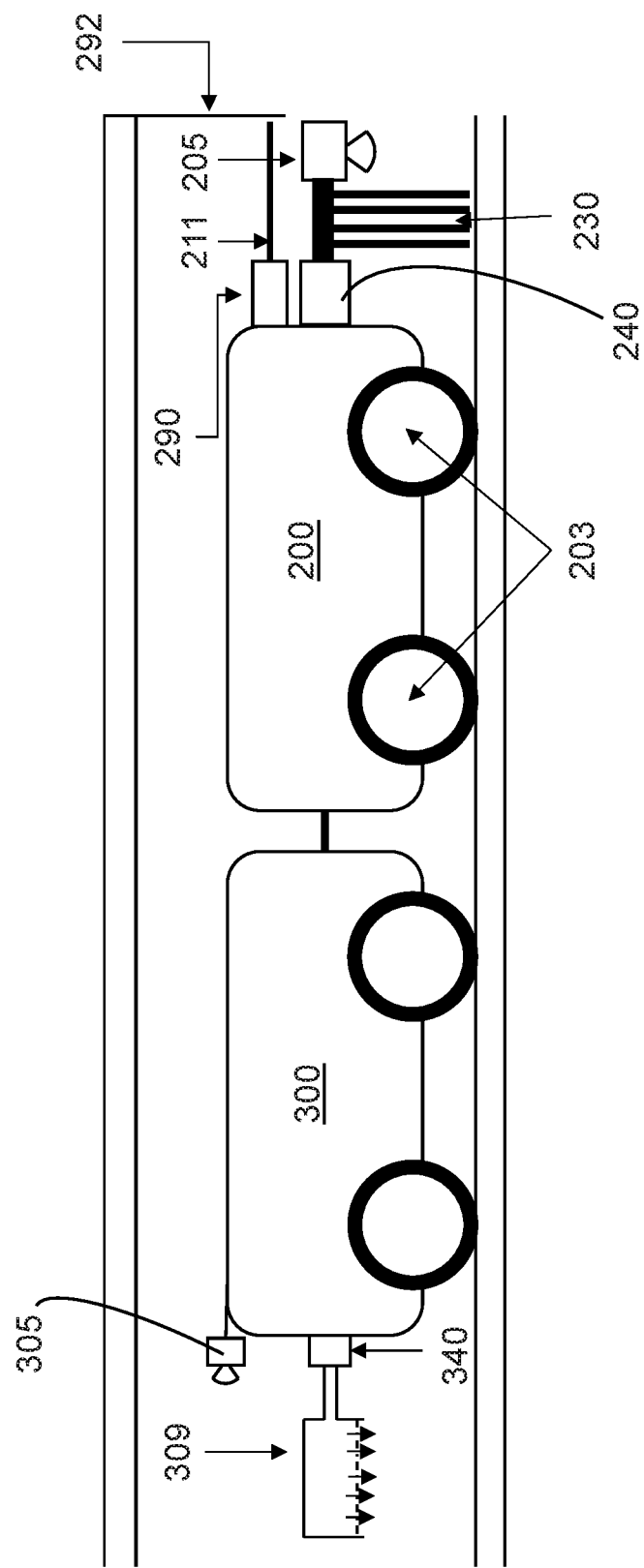
FIG. 2 is a side elevation view of an autonomous coating and inspection system according to one embodiment.

The automated mobile robotic system 100 includes a main chassis (main body) that has a first end and an opposite second end. The first end can represent the front end of the system 100, while the second end can represent the back end of the system 100. The main chassis can include sets of wheels or the like to allow the system 100 to drive within the inside of the pipe 10. Unlike conventional trains of modules, the present system 100 can be constructed as a single module (single device) that performs multiple operations as opposed to the single module single operation techniques of the conventional systems or alternatively, as shown in FIG. 2, the system 100 can include a number of modules (robotic devices) that are tethered together and can move as a unit. As described herein, the system 100 includes at least one on-board computer and at least one imaging device that is also described herein.

Figure 1:
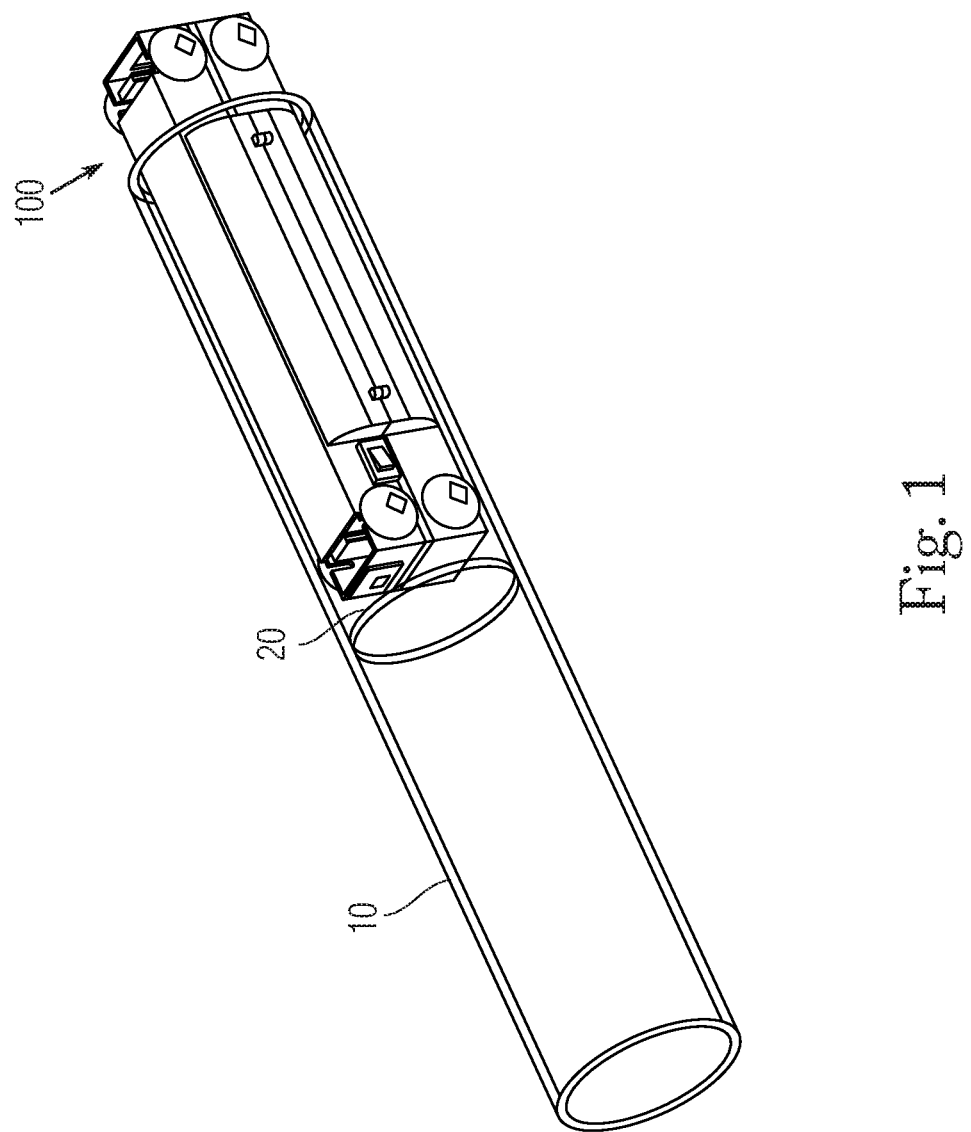
FIG. 1 is a perspective view of a pipe formed of two segments with a weld joint formed therebetween and an in-pipe robotic device is illustrated within the pipe.

FIG. 1 illustrates a length of pipe 10 that is formed of two pipe segments that interface at and are joined at a weld joint 20. The weld joint 20 is thus the location at which a weld is formed to sealingly join the two pipe segments. Since the pipe 10 is formed of a number of interconnected pipe segments, the pipe 10 contains a number of weld joints 20.

Now referring to FIGS. 1-8 in which one exemplary autonomous coating and inspection system 100 is illustrated and is configured to detect weld joints 20 and perform localized recoating only in the defected area at which a holiday or like that is located within the in-pipe coating that covers one of the weld joints 20. The system 100 includes a first robotic (crawler) device 200 and a second robotic (crawler) device 300 and can include additional robotic (crawler) devices that can in one embodiment, be coupled to one another to form a train as shown in FIG. 2. While each of the robotic devices 200, 300 is described as being configured to perform one operation, it will be appreciated that each of the robotic devices 200, 300 can perform more than one operation or task.

In the illustrated embodiment, the first robotic device (a first crawler) 200 is configured to detect and determine the precise location of the weld joint 20 and more specifically, detect and determine the precise location of a defect, such as a holiday, in the weld joint 20 (i.e., in the coating covering the weld joint). As mentioned herein, the first robotic device 200 is configured to not just identify the weld joint 20 that needs repairs but instead, it identifies a precise location of localized area of the defect to allow repair of only the localized repair and not the entire coating of the weld joint 20.

The second robotic device (a second crawler) 300 is configured to recoat the weld joint 20 and more specifically, it can be configured to recoat only the localized area of the coating this is identified as having a defect (holiday) that is within the coating.

Figure 6:
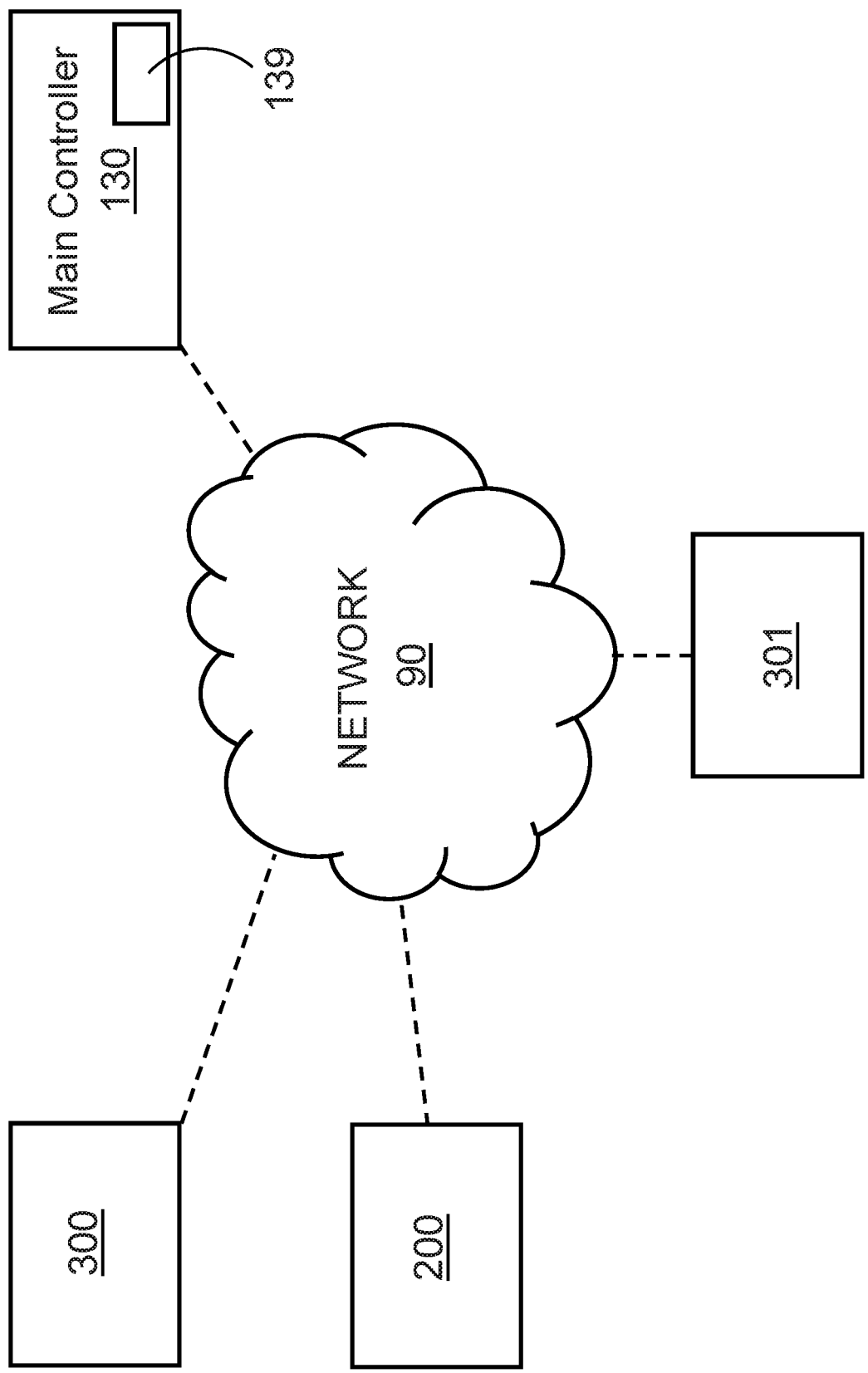
FIG. 6 is a block diagram illustrating an exemplary network configuration in accordance with one or more implementations of the present system.

As shown in FIG. 6, each of the robotic devices 200, 300 communicates over a communications network 90 to allow information to be communicated both between the robotic devices 200, 300 and between the various devices and a main or server computing device 130 that is typically located outside the pipe string 10. These details are described in more detail herein. This arrangement allows for the operator to view substantially in real-time images and/or live video feed of the weld joint, as well as data and measurement taken at the weld joint and also allows the operator to control certain movements of the various devices if necessary.

With continued reference to FIG. 1, various forms of computing devices are accessible to the network 90 and can communicate over the network 90 to the various machines that are configured to send and receive content, data, as well as instructions that, when executed, enable operation of the various connected robotic devices within the pipe string 10. The content and data can include information in a variety of forms, including, as non-limiting examples, text, audio, images, and video, and can include embedded information such as links to other resources on the network, metadata, and/or machine executable instructions. Each computing device can be of conventional construction, and while discussion is made in regard to servers that provide different content and services to other devices, such as mobile computing devices, one or more of the server computing devices can comprise the same machine or can be spread across several machines in large scale implementations, as understood by persons having ordinary skill in the art. In relevant part, each computer server has one or more processors, a computer-readable memory that stores code that configures the processor to perform at least one function, and a communication port for connecting to the network 90. The code can comprise one or more programs, libraries, functions or routines which, for purposes of this specification, can be described in terms of a plurality of modules, residing in a representative code/instructions storage, that implement different parts of the process described herein. As described herein, each of the robotic devices (tools) has a controller (processor) and thus, comprises one form of the above-described computing device.

Further, computer programs (also referred to herein, generally, as computer control logic or computer readable program code), such as imaging or measurement software, can be stored in a main and/or secondary memory and implemented by one or more processors (controllers, or the like) to cause the one or more processors to perform the functions of the invention as described herein. In this document, the terms "memory," "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like. It should be understood that, for mobile computing devices (e.g., tablet), computer programs such as imaging software can be in the form of an app executed on the mobile computing device.

The main computing device 130 can include a graphical user interface (GUI) 139 that can be provided to allow for remote control over the system 100. As is known, the GUI 139 is a system of interactive visual components for computer software. A GUI displays objects that convey information and represent actions that can be taken by the user. The objects change color, size, or visibility when the user interacts with them. GUI objects include icons, cursors, and buttons. These graphical elements are sometimes enhanced with sounds, or visual effects like transparency and drop shadows.

The graphical user interface 139 typically includes a display, such as a touch screen display to allow user input to be registered and then steps are taken by the processor.

Figure 7:
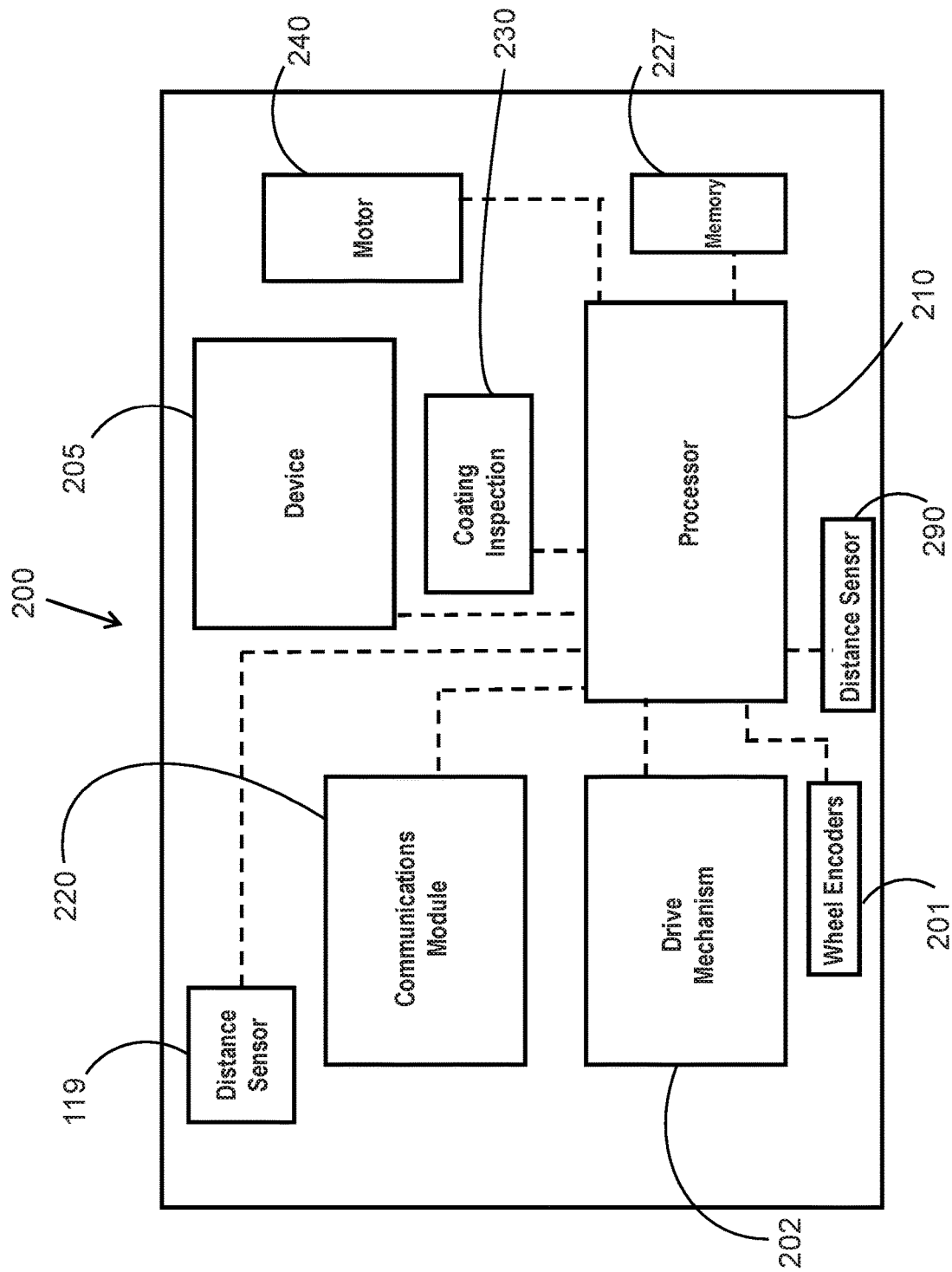
FIGS. 7 and 8 are block diagrams illustrating exemplary hardware components of the system in accordance with one or more implementations.

As mentioned, and shown in FIG. 7, the first robotic device 200 is configured to controllably travel within the inner confines of the pipe string (pipeline) 10 and travel to a specific location(s) within the pipe string 10 such as each girth weld 20. As a result, the first robotic device 200 is capable of traveling internally within the pipe string 10 to different locations and then ultimately exit the pipe string 10. Since a pipe crawler by definition must be capable of traveling within the pipe string 10 in a controlled manner, the first robotic device 200 includes a drive mechanism 202 that allows the first robotic device 200 to traverse and travel within the pipe string 10. The drive mechanism 202 can consist of any number of different conventional drive mechanisms and generally includes drive wheels 203 (e.g., FIG. 2) or continuous tracks (tank treads) that surround drive wheels. One or more motors, such as an electric motor (e.g., a DC servomotor) can be used and is connected to a power source, such as a battery, that powers the motor as well as other electronics contained onboard the first robotic device 200. In this manner, the first robotic device 200 can be driven to a precise location within the pipe string 10.

As mentioned above, one function of the first robotic device 200 is to assess the precise location and condition of the weld joint 20 within the pipe string 10.

The first robotic device 200 can thus be in the form of a multi-sensor platform that carries a variety of condition assessment tools inside the pipe string 10 in a single deployment and, as described herein, can also provide images and/or live video that can aid in detecting anomalies within the pipe string 10.

The first robotic device 200 includes at least one imaging device 205 which is configured to provide an image of the inside of the pipe 10. The at least one imaging device 205 can be in the form of a camera and more particularly, a digital camera. Instead of film, a digital camera has a sensor that converts light into electrical charges. The image sensor employed by most digital cameras is a charge coupled device (CCD). Some cameras use complementary metal oxide semiconductor (CMOS) technology instead. Both CCD and CMOS image sensors convert light into electrons. The imaging device 205 can provide a continuous digital camera stream to the operator. When positioned at one end of the main chassis of the first robotic device 200, the imaging device 205 looks forward into the pipe 10 as the system 100 drives within the pipe 10. A real time stream is thus provided by the imaging device 205 and can be viewed by the operator at the main computing device 130 (FIG. 6) and can also be fed to at least one on-board computer 210 that is associated with the first robotic device 200.

The first robotic device 200 has one or more onboard computer that includes a main processor 210 (PCB) that is operatively connected to the at least one imaging device 205, as well as other sensors and electronics described herein. The main processor 210 can be operatively connected to a communications module 220 that permits commands and data, images, video feeds, etc. to be communicated between the processor 210 and a main controller that is typically located outside the pipe string 10 and can be part of a computing device (e.g., computing device 130) that has a display on which the profile data, images, video feeds, etc. can be displayed. Memory 227 is preferably provided as part of the first robotic device 200.

Coating Inspection Tool 230

The first robotic device 200 includes a coating inspection tool (module) 230 that is configured to detect an anomaly (holiday) that is located within the in-pipe coating. Coating inspection is important in order to confirm that the coating is free of potential deficiencies, such as holidays. Thus, in on aspect, the coating inspection tool 230 can be considered to be a holiday testing tool that is configured to detect a holiday within the coating that covers the weld joint 20.

As is generally known, holiday detectors are used to inspect coatings for pin holes, scratches or other coating faults. Holiday detectors work by generating a voltage high enough to jump a gap that is longer than the thickness of the coating. The laws of physics determine the required voltage level to jump a given distance, or gap. A holiday test or continuity test is one of the non-destructive test methods applied on protective coatings to detect unacceptable discontinuities such as pinholes and voids. The test involves checking of an electric circuit to see if current flows to complete the electrical circuit.

Figure 3:
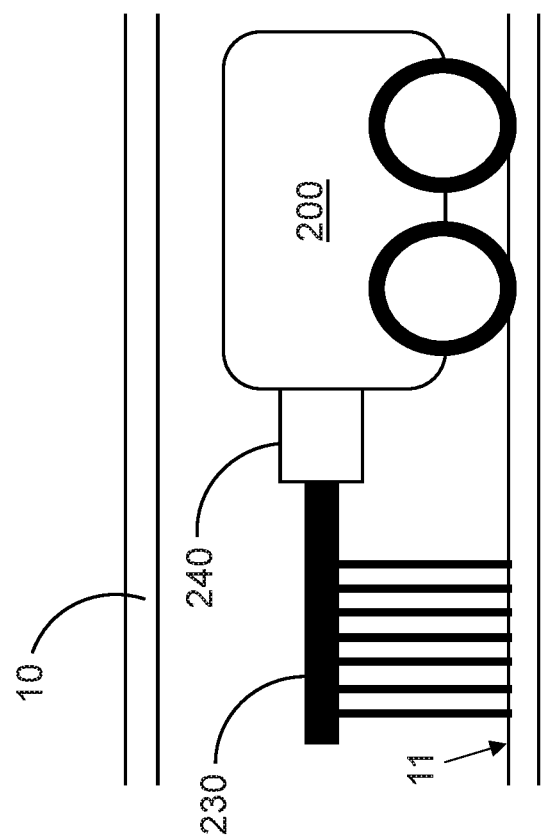
FIG. 3 is a side elevation view of an autonomous holiday testing system that is part of the overall system illustrated in FIG. 2.
Figure 4:
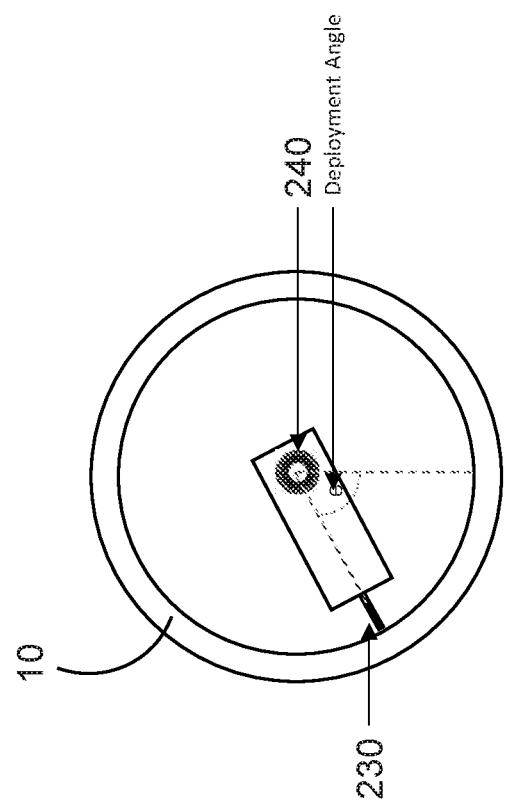
FIG. 4 is an end view showing the inside of a pipe with a motorized holiday testing tool in contact with an inner surface of the pipe.

The coating inspection tool 230 of the automated system 100 comprises a straight/flat holiday test tool, for example a brush that is shown in FIGS. 2-4, or any similarly shaped tool (e.g. straight/flat sponge) that can be used for holiday testing, that is mounted on the first robotic device 200 (in-pipe robotic crawler) as described in more detail herein. In particular, an integral aspect of the present method and system 100 of the present disclosure is that the precise location of the holiday is detected and thus, the localized area that is flagged for repair is calculated based on the measured angle at which the holiday is detected. As a result, it will be appreciated that a circular holiday test brush cannot be used to determine the angle at which the holiday is detected. A circular holiday test brush at best can only detect the presence of the holiday but cannot determine the precise location of the holiday along the inner coating within the pipe 10. Since the objective of the present system 100 is to accurately localize the holiday and recoat only the detected area, the precise location of the holiday is required.

The straight tool (coating inspection tool 230) is rotationally actuated using a first motor 240 with an encoder which provides accurate feedback of the angle of deployment of the tool 230 as shown in FIGS. 2-4. The first motor 240 is thus associated with and carried by the first robotic device 200. The coating inspection tool 230 can thus be mounted to a drive shaft that is coupled to the first motor 240 which permits controlled rotation of the coating inspection tool 230 (straight/flat holiday test tool). As is known, a rotary encoder (also referred to as shaft encoder) is an electro-mechanical device that converts the regular position or motion of a shaft or axle to analog or digital output signals. Traditionally, there are two main types of rotary encoder: absolute and incremental. The output of an absolute encoder indicates the current shaft position, making it an angle transducer. The output of an incremental encoder provides information about the motion of the shaft, which typically is processed elsewhere into information such as position, speed and distance. FIG. 4 shows the inside of the pipe 10 with the coating inspection tool 230 in contact with one radial location of the inside of the pipe 10 and a deployment angle (a) being shown between a reference axis and an axis of the coating inspection tool 230. This angular position of the location of the coating inspection tool 230, as well as the axial (longitudinal) position of the coating inspection tool 230 and the first robotic device 200 for that matter allows for precise location of the holiday to be determined.

The first motor 240 can be commanded by the microcontroller (processor 210) to automatically perform a 360 sweep over the inner surface 11 of the pipe 10 along the coating at the weld joint 20. Once a holiday signal is detected, the corresponding brush angle (of the coating inspection tool 230), which is calculated from the motor's encoder signal, is recorded.

The coating inspection tool 230 is thus designed to detect the position of all of the holidays that are identified around an in-pipe section.

Alternative Coating Inspection Tool 230

As an alternative to a holiday testing tool, the coating inspection tool can be in the form of a device that can measure the dry film thickness (DFT). As is known, dry film thickness (DFT) is the thickness of a coating as measured above the substrate. Dry film thickness (DFT) can be measured using two methods: destructive thickness measurement, where the coating is cut to the substrate using a cutter; and non-destructive coating thickness measurement, using techniques which do not damage the coating or the substrate such as magnetic, magnetic induction and eddy.

Second Robotic Device 300

As mentioned, and shown in FIG. 2B, the second robotic device 300 is configured to controllably travel within the inner confines of the pipe string (pipeline) 10 and travel to a specific location(s) within the pipe string 10 such as each girth weld 20 (FIG. 1). As a result, the second robotic device 300, like the first robotic device 200, is capable of traveling internally within the pipe string 10 to different locations and then ultimately exit the pipe string 10. Since a pipe crawler by definition must be capable of traveling within the pipe string 10 in a controlled manner, the second robotic device 300 includes a drive mechanism 302 that allows the second robotic device 300 to traverse and travel within the pipe string 10. The drive mechanism 302 can consist of any number of different conventional drive mechanisms and generally includes drive wheels or continuous tracks (tank treads) that surround drive wheels. One or more motors, such as an electric motor (e.g., DC servomotor) can be used and is connected to a power source, such as a battery, that powers the motor as well as other electronics contained onboard the second robotic device 300. In this manner, the second robotic device 300 can be driven to a precise location within the pipe string 10. As mentioned, the second robotic device 300 can be tethered to the first robotic device 200, as shown, or they can be separate devices that are driven independent from one another.

As mentioned above, the main function of the second robotic device 300 is to coat the inspected area at which the holiday has been identified as being present and as mentioned, only the localized area of the holiday is recoated as opposed to recoating the entire weld joint 20 within the pipe string 10.

The second robotic device 300 can thus be in the form of a multi-sensor platform that carries a coating spray mechanism which can be in the form of an actuated coating nozzle 309 that is configured to spray (deliver) the coating material onto the inside surface of the pipe 10. The second robotic device 300 can, as described herein, also provide images and/or live video that can aid in assessing and evaluating the recoating process.

The second robotic device 300 can include at least one imaging device 305 which is configured to provide an image of the inside of the pipe 10. The at least one imaging device 305 is similar or the same as the imaging device 205 and can be in the form of a camera and more particularly, a digital camera (e.g., CCD and CMOS). The imaging device 305 can provide a continuous digital camera stream to the operator. When positioned at one end of the main chassis of the second robotic device 300, the imaging device 305 looks forward into the pipe 10 as the system 100 drives within the pipe 10. The imaging device 305 is positioned such that the weld joint 20 can be viewed and more particularly, the recoating process of the weld joint 20 can be viewed and in particular, the recoating can be viewed and evaluated. A real time stream is thus provided by the imaging device 305 and can be viewed by the operator at the main computing device 130 and can also be fed to at least one on-board computer 310 that is associated with the second robotic device 300.

The second robotic device 300 has at least one main (onboard) processor (computer) 310 (PCB) that is operatively connected to the at least one imaging device 305, as well as other sensors and electronics described herein. The main processor 310 can be operatively connected to a communications module 320 that permits commands and data, images, video feeds, etc. to be communicated between the processor 310 and a main controller that is typically located outside the pipe string 10 and can be part of a computing device (e.g., computing device 130) that has a display on which the profile data, images, video feeds, etc. can be displayed. Memory 327 is preferably provided as part of the second robotic device 300.

As shown, the imaging device 305 and the coating nozzle 309 can be located at one end of the second robotic device 300, while the opposite end is the end which can be tethered to the first robotic device 200.

Distance Sensor and Positioning Feedback

The second robotic device 300 (coating module) can be commanded to automatically position itself around the inspected section to prepare for coating of the weld joint within the localized holiday area. The automated accurate positioning of the second robotic device 300 requires accurate position feedback.

The actuated coating nozzle 309 can be rotationally actuated using a second motor 340 with an encoder (e.g., rotary encoder) which provides accurate feedback of the angle of coating nozzle 309 much like the coating inspection tool 210. The second motor 340 is thus associated with and carried by the second robotic device 300. The coating nozzle 309 can thus be mounted to a drive shaft that is coupled to the second motor 340 which permits controlled rotation of the coating nozzle 309. The second motor 240 can be commanded by the microcontroller (processor 310) to sweep over the inner surface of the pipe 10 along the coating at the weld joint 20 to allow for precise positioning of the coating nozzle 309 at the inspection area that is to be recoated.

In order to properly position the system 100 at the desired location (e.g., axial location) within the pipe 10, a positioning system is provided that can consist of wheel encoders 201 and a distance sensor 290 as shown in FIG. 7. As shown, the wheel encoders 201 are associated with the first robotic device 200. Wheel encoders 201 can be used to provide accurate position estimate of the crawler (first robotic device 200 and/or second robotic device 300) from the entrance of the pipe 10. However, if the wheels of the robotic devices 200, 300 slip for any reason, position estimates can become wrong and unreliable.

The distance sensor 290, such as a 1D LIDAR, can be used to provide position estimates of the system 100 that are not affected by wheel slippage. However, a LIDAR emits a laser beam 211 and calculates distance based on the measured reflections. As a result, a reflective surface 292 is required, which is usually not available at the opening of pipe 10. So, a simple solution is to partially block the pipe opening with the reflective surface 292, which as illustrated can be a reflective sheet in order for the LIDAR to give distance measurement with respect to the pipe opening. The reflective surface 292 is thus at the pipe opening and extends downward into the pipe opening at a sufficient distance such that it is in contact with an axis of the laser beam. The reflective surface 292 can be positioned in place at the pipe opening after the system 100 enters into the inside of the pipe 10.

Both encoder measurements and LIDAR measurements can be fused using software filtering techniques to provide millimeter distance accuracy with respect to the pipe opening. The final position estimate can be used to: (1) provide accurate position estimates for detected holidays; and (2) automatically position the coating module for accurate and localized coating. Thus, the distance sensor 290 is in communication with the processor and the drive mechanism is operated in view of the information provided by the distance sensor 290.

Thus, similar to the holiday testing module (first robotic device 200), the coating module (second robotic device 300) the actuated coating nozzle 309 is operated with second motor 340 with an encoder. The coating nozzle 309 is assumed to spray coating in one direction to allow localized spraying around the defective area; however, it is possible for the coating nozzle 309 to spray in more than one direction. The recorded orientation of each holiday can be used to orient the coating nozzle 309 for coating at least a localized area of the weld joint where one or more holidays (or other defects) are located.

The positioning module which can be in the form of the first robotic device 200 and includes the wheel encoder 201 that is part of the first robotic device 200 and the distance sensor 290 can be used for positioning any other crawler and not just restricted to the inspection module (first robotic device 200) or the coating module (second robotic device 300).

It will be appreciated that the aforementioned positioning system works in straight pipe, such as pipe 10. For non-straight pipes, vision-based localization can be used to detect welded joints 20 that to be coated. The vision-based system that can be used to detect the welded joints 20 can consist of the on-board camera (imaging device 305, 205) that is connected to the respective onboard computer. The on-board computer is configured to run a weld detection module which runs weld detection algorithms which provides the location of the detected weld with respect to the onboard computer. More specifically, the weld detection algorithm can be configured to analyze the feed stream from the imaging device 305 (vision system) in order to detect the presence of the weld joint 20 and since the position of the system 100 (and robotic device) within the pipe 10 can be calculated based on the wheel encoders, the estimated distance to the detected joint weld 20 can be calculated. It will be understood that the vision-based system can be used in straight pipes as well as another means for detecting the weld joint location.

Figure 5B:
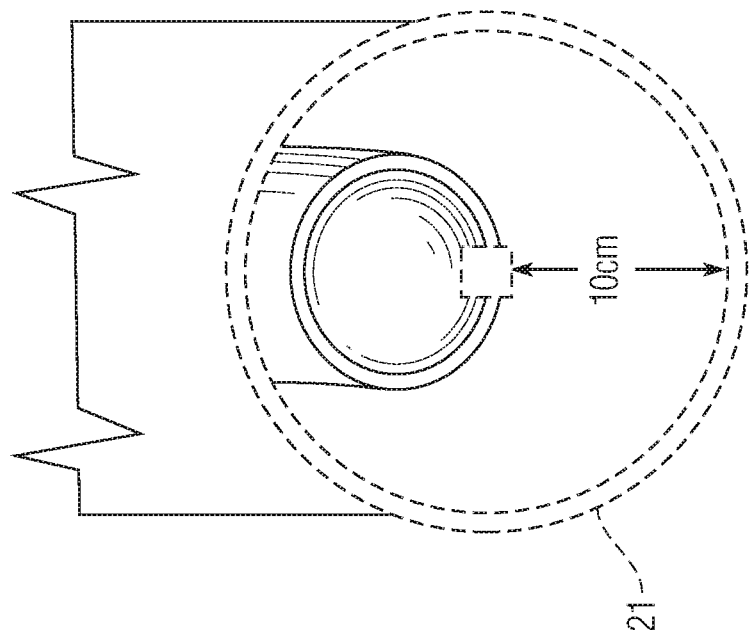
FIG. 5B is a view within the pipe showing the detected weld joint with a marker (e.g., overlaid circle) being placed over the image of the weld joint by a vision algorithm.
Figure 5A:
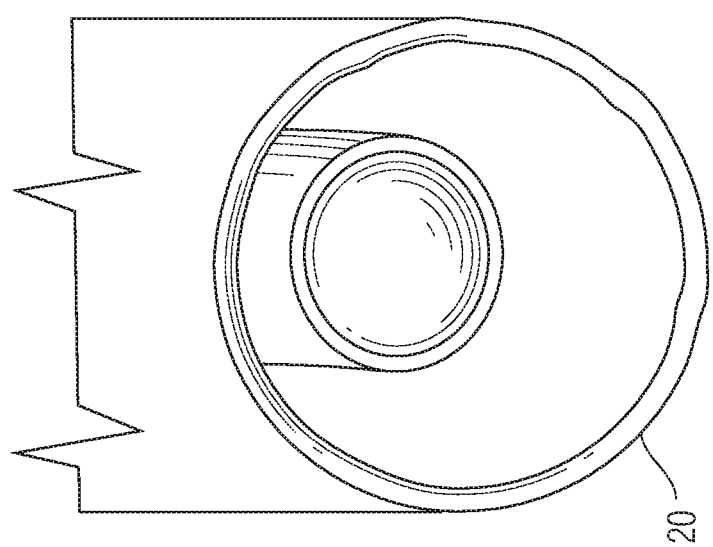
FIG. 5A is a view within the pipe as seen by a vision-based weld joint detection system with one weld joint being visible.

For example, FIGS. 5A and 5B illustrate images of an in-pipe weld joint 20 that is detected by the onboard camera 305 using the feed therefrom. The detected weld 20 can be marked (identified) by a marker 21, such as a circle, and the estimated distance from its center is shown. The software can estimate the (normal) distance from the center point based on the dimensions of the marker 21 which represents the location of the detected weld joint 20. The marker 21 can have a contrasting color that allows it to be readily seen and differentiated from the surrounding pipe surface. In addition, and as shown, the estimated distance can be visually displayed as well as a numerical value.

As discussed in detail below, prior to applying a coating with the second robotic device 300, a number of steps are often performed in order to prepare the weld for the coating step. Like the other devices described herein that are part of the overall system 100, each of the weld preparation robotic devices operate in an autonomous manner and can supply data and information for confirmation by the user and the user can intervene and take control over any of the devices in the event of an emergency or the like.

Third Robotic Device 301

Figure 8:
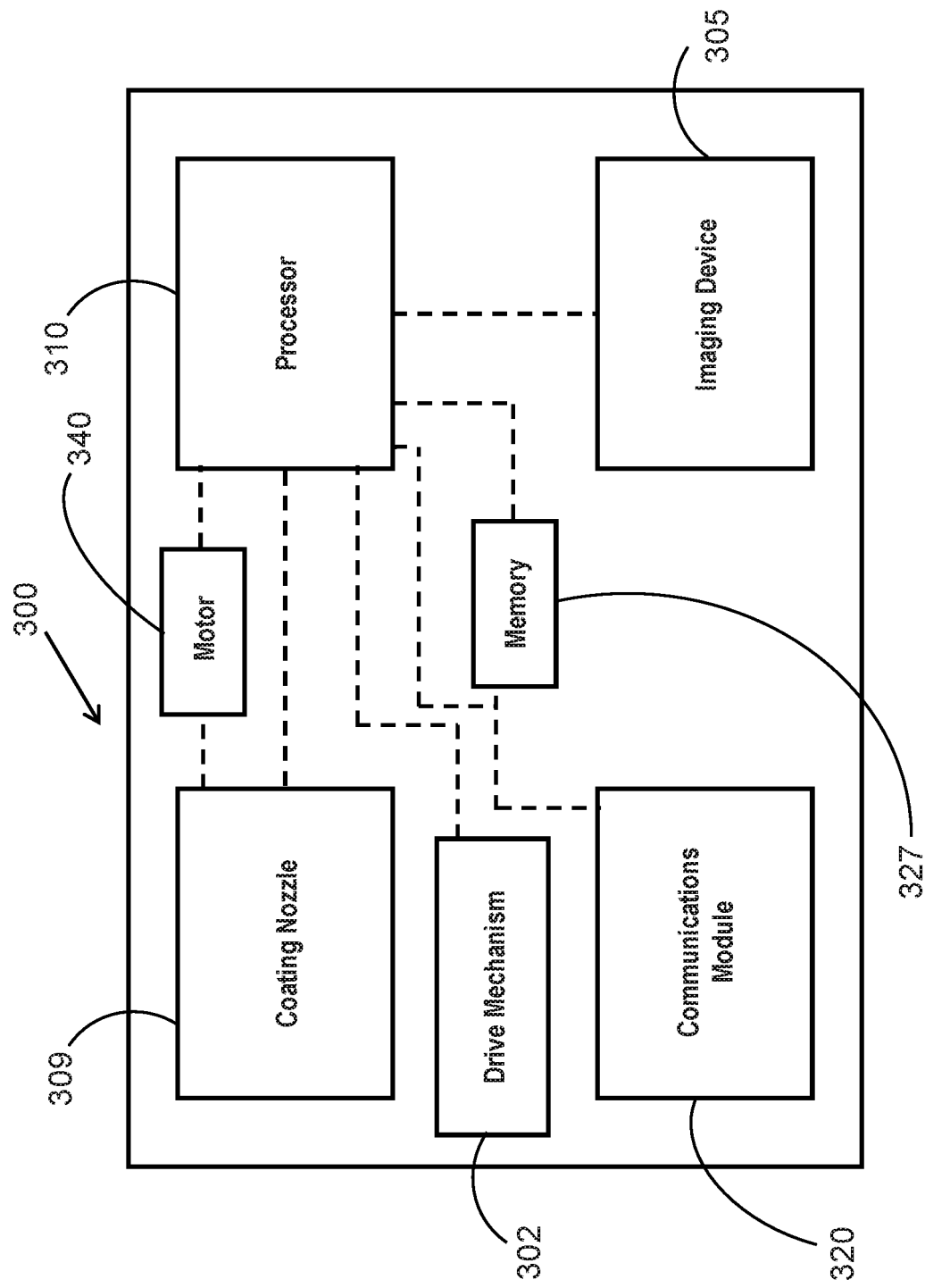
Figure 9:
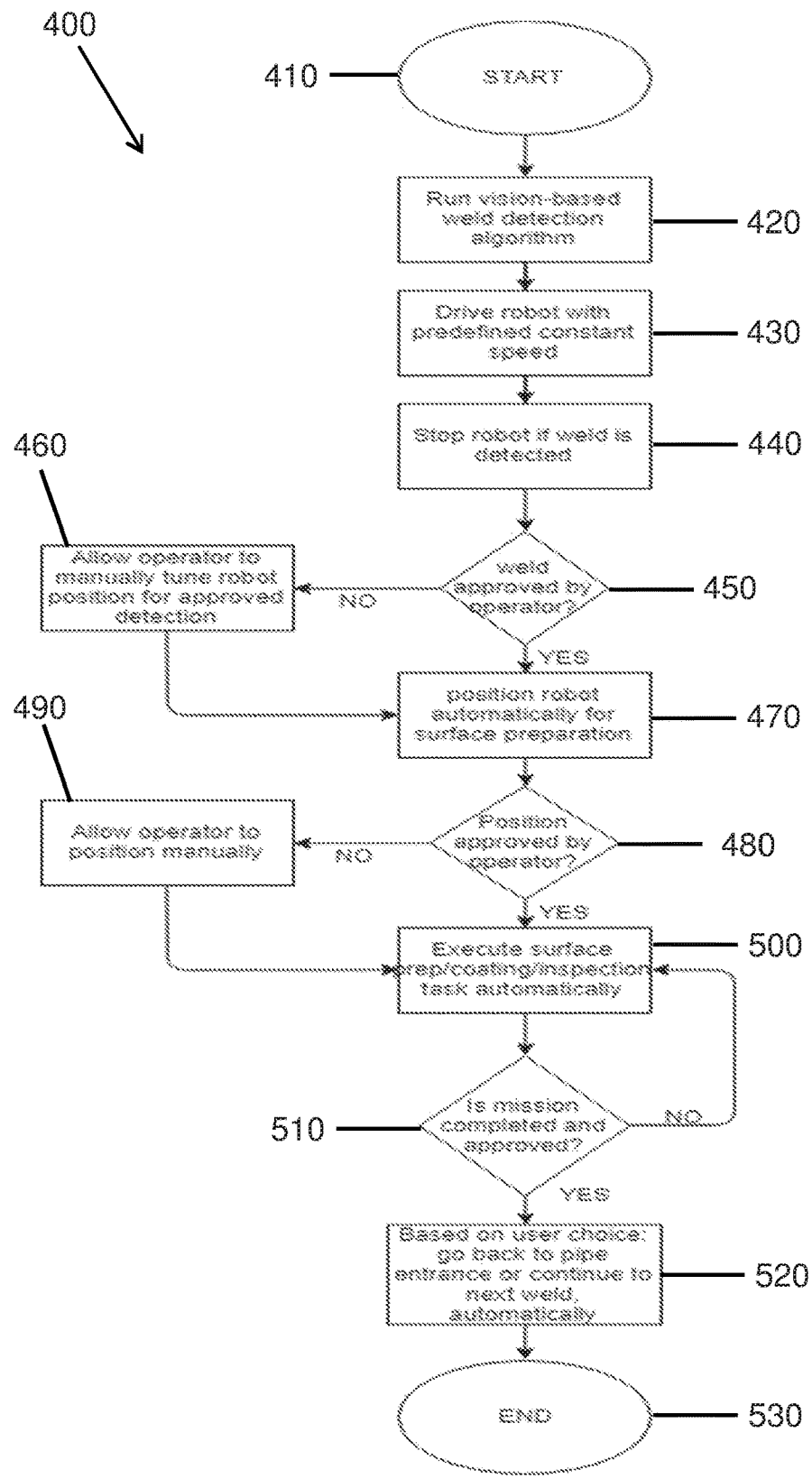
FIG. 9 is a flow diagram illustrating a routine for coordinating and executing specific tasks required to complete the inspection and coating of field girth welds inside pipes using in-pipe robotic devices (crawlers)

As described herein, part of the automated process of coating the weld joint involves surface preparation of the weld joint surface using traditional surface preparation techniques, such as grit blasting, etc. The system 100 can include a surface preparation module in the form of a third robotic device 301 that can be separate from the first and second robotic devices 200, 300. In other words, the third robotic device 301 can include the same or similar basic features that are shown in FIGS. 7 and 8, such as a drive mechanism, processor (on-board computer), imaging device (vision system), communications module, memory, etc., and will further include one or more surface preparation tools, such as an automated grit blasting tool. Exemplary tools are described with reference to FIGS. 10-13.

While the surface preparation module can be in the form of a separate robotic device (crawler), it can also be incorporated into one of the other robotic devices and more particularly, the surface preparation module can be incorporated into the second robotic device 300 which is configured to coat the weld joint. In that case, the second robotic device 300 can both surface prep the area (weld joint) that is to be coated and then subsequently coat the area using the spray nozzle.

As with the other robotic devices, the third robotic device 301 is automatically positioned at a target location relative to the weld joint to permit the third robotic device 301 to perform its operation.

As discussed herein, instruments like a digital cameras, encoders, and proximity sensor can provide much more accurate feedback than a human eye, and when used in a control loop, they can provide an automated process control with minimal error and execution time. The present system 100 thus contains a certain level of automation along with operator-robot-interaction in the in-pipe robots that perform weld joint surface preparation, coating, and coating inspection. The proposed automation method for each task is detailed as follows.

Automation Method for Surface Preparation Task

The in-pipe weld surface usually requires certain preparation before coating. For example, using grit blasting technique or similar process. To automate the process that is executed by the surface preparation robot the following steps are part of an exemplary process 400 that is set forth in FIG. 9 which sets forth the automated tasks of the robotic devices 200, 300. The overall process has a start (first) step 410 which can include inserting the system 100 into the pipe 10. At a second step 420, the operator issues a start command for the mission from a graphical user interface 139 that can be part of the computing device 130 and can involve running the vision-based weld detection algorithm described herein. As shown at a third step 430, this command step also begins operation of the process and causes the robotic system 100 to begin travelling within the pipe 10 at a predefined constant speed towards one or more of the weld joints 20. The predefined constant speed can be entered using the graphical user interface 139.

As mentioned in step 420, once the mission starts the vision-based weld detection algorithm, which runs on the robot devices on-board computer starts. This algorithm uses computer vision techniques to analyze the onboard digital camera stream (from the imaging devices) and identifies the weld 20. It continuously overlays the detected weld perimeter on the original image stream which is displayed in the operator's graphical user interface. The algorithm also provides an estimate of the normal distance from the detected weld based on the distance calculating techniques discussed herein.

At a fourth step 440, once a weld joint 20 is detected, the system 100 (the two robotic devices 200, 300) stops, and notifies the operator in order to approve the weld detection. As mentioned, the detection of the weld joint 20 is based on the step 420 in which the vision-based weld detection algorithm is run.

At a fifth step 450, the operator either approves the detected weld joint 20 or does not approve. This process once again can involve a review of the data from the weld detection algorithm as well as captured images, etc.

In the event that the operator does not approve the detected weld joint 20, then at a sixth step 460, the operator (using the user interface 139) can control the drive mechanism of the system 100 to manually tune the position of the system 100 (robotic devices) for approved detection of the weld joint 20.

At a seventh step 470, once a detected weld is approved at step 450, and based on the estimated distance from the detected weld, the robot automatically positions itself with respect to the weld joint 20 according to a predefined distance value. The predefined distance is defined based on the required pose of the surface preparation module (robotic device 200) with respect to the weld joint. At an eighth step 480, the operator is asked to approve the position of the system 100 and in particular, to confirm it is properly positioned for surface preparation operation.

In the event that the operator does not approve the position, then at a ninth step 490, the operator can manually position the system in a desired position suitable for surface preparation.

At a tenth step 500, the surface preparation operation starts once the surface module position is approved by the operator. The task is completed automatically after a predefined time limit is achieved. The predefined time limit is a function of the surface preparation module characteristics. It will be appreciated that an in-pipe weld surface usually requires certain preparation before coating.

At an eleventh step 510, the operator is asked to review and confirm that the mission is completed and approved. If the operator does not approve the mission at step 510, the process loops back to step 500.

Once the task is completed and approved by the operator at step 510, the operator can choose either the system 100 automatically goes to the entrance of the pipe 10, or continue to a subsequent weld joint 20 at a twelfth step 520. If going to a subsequent weld joint 20 is chosen, go to the step 430.

The process ends at step 530.

Automation Method for Coating Task

The steps to follow in order to automate the task of coating the pipe 10 are the same as the previous ones (the above steps) with the following modifications.

For the step 470, once a detected weld 20 is approved, and based on the estimated distance from the detected weld 20, the robot (system 100) automatically positions itself with respect to the weld joint 20 according to a predefined distance value. The predefined distance is defined based on the required position of the coating module (the second robotic device 300) with respect to the weld joint 20.

For the step 500, the coating operation starts once the coating module (second robotic device 300) position is approved by the operator (as by using the graphic user interface). The coating area can be adjusted based on a user-defined distances before and after the weld joint 20 and the coating operation can be executed automatically based on this information as well as the specifications of the coating module (second robotic device 300) and the coating material.

Automation Method for Coating Inspection Task

The steps to follow in order to automate this task are the same as the previous ones with the following modifications.

For the step 470, once a detected weld 20 is approved, and based on the estimated distance from the detected weld 20, the robot (system 100) automatically positions itself with respect to the weld joint 20 according to a predefined distance value. The predefined distance is defined based on the required pose of the coating inspection module (second robotic device 300) with respect to the weld joint 20.

For the step 500, the coating inspection operation starts once the surface inspection module (first robotic device 200) position is approved by the operator. The task is completed automatically after a predefined inspection sequence is executed. The inspection sequence is defined based on the inspection tools best practices.

As discussed herein, the coating inspection operation involves the use of the coating inspection module 200 along with the coating inspection tool 230 which is particularly suited for discovering anomalies, such as holidays, that are within the coating. In the event that a holiday or the like is discovered, the precise location of the holiday is logged and recorded (based on the known location of the inspection module 200 and the deployment angle of the coating inspection module 200). Instead of a complete recoating of the entire weld joint, as discussed herein, only the localized area of the coating where the holiday is detected is recoated with the coating module. This can require movement of the system 100 (the robotic crawlers) so as to position the coating module relative to the weld joint and then recoat the specific localized area based on the stored information concerning the precise location of the holiday.

Additional Features

The system 100 can include additional features that serve many different functions. For example, an emergency stop can be provided via the graphical user interface should the operator take control at any time. More specifically, the stop can be in the form of a button or the like (e.g., graphical element, such as windows, icons, etc.). In addition, both manual and autonomous operation modes should be accessible by the operator using the graphical user interface.

Autonomous Modules for Measuring Weld Bead Depth and Weld Bead Depth Grinding Rectification In accordance with another embodiment, the overall system 100 described herein can include additional robotic devices (modules) that are part of the system 100 and are each complementary to one another as described herein.

For example, the system can include an autonomous of the weld bead depth measurement and scanning and an autonomous weld bead depth grinding rectification tool. Each of these tools can be embodied in individual robotic devices or can be embodied in separate robotic devices as described below. For ease of illustration, the tools are described separately. For example, the weld bead depth measurement and scanning tool can be embodied in a third robotic device 600 and the weld bead depth grinding tool can be embodied in a fourth robotic device 700. As described herein, the robotic devices can be all combined in an autonomous train. For example, a single train cart can carry both modules to perform weld scanning and rectification. The cart detects and approaches the weld autonomously and awaits user confirmation similar to the coating application described herein.

Figure 10:
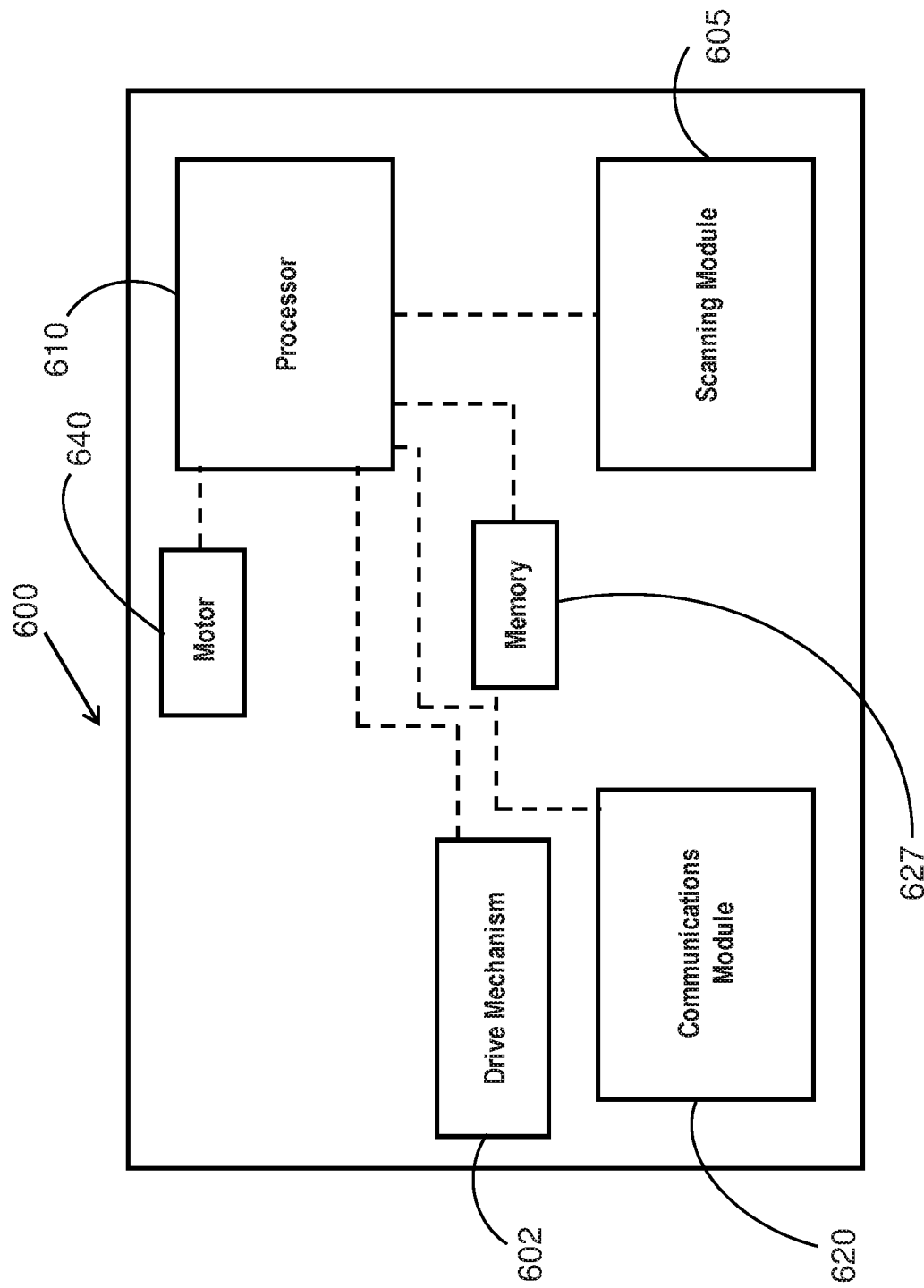
FIGS. 10-13 are block diagrams illustrating exemplary hardware components of the system in accordance with one or more implementations.

Third Robotic Device 600 (FIG. 10)

The third robotic device 600 can include a scanning module 605 that is configured to measure the weld bead depth autonomously using a tool, such as a laser, to estimate how deep the weld is penetrating the pipe. Any number of suitable technologies that can be used for scanning the weld. The scanning module 650 is thus configured to not only detect the weld and estimate its depth but also can detect any sharp edges or the like. The measurements of the scanning module 605 can be viewed by the operator at the main computing device 130 and can also be fed to at least one on-board computer 610 that is associated with the third robotic device 600.

The third robotic device 600 has the at least one main (onboard) processor (computer) 610 (PCB) that is operatively connected to the scanning module 605, as well as other sensors and electronics described herein. The main processor 610 can be operatively connected to a communications module 620 that permits commands and data, images, video feeds, etc. to be communicated between the processor 610 and a main controller that is typically located outside the pipe string 10 and can be part of a computing device (e.g., computing device 130) that has a display on which the profile data, images, video feeds, etc. can be displayed. Memory 627 is preferably provided as part of the third robotic device 600.

The scanning module 605 can be rotationally actuated using a third motor 640 with an encoder (e.g., rotary encoder) which provides accurate feedback of the angle of scanning module much like the coating inspection tool 210. A drive mechanism 602 is provided for controllably driving the third robotic device 600.

The drive mechanism 602 can consist of any number of different conventional drive mechanisms and generally includes drive wheels or continuous tracks (tank treads) that surround drive wheels. One or more motors, such as an electric motor (e.g., DC servomotor) can be used and is connected to a power source, such as a battery, that powers the motor as well as other electronics contained onboard the third robotic device 600. In this manner, the third robotic device 600 can be driven to a precise location within the pipe string 10. As mentioned, the third robotic device 600 can be tethered to the other robotic devices or they can be separate devices that are driven independent from one another.

Figure 11:
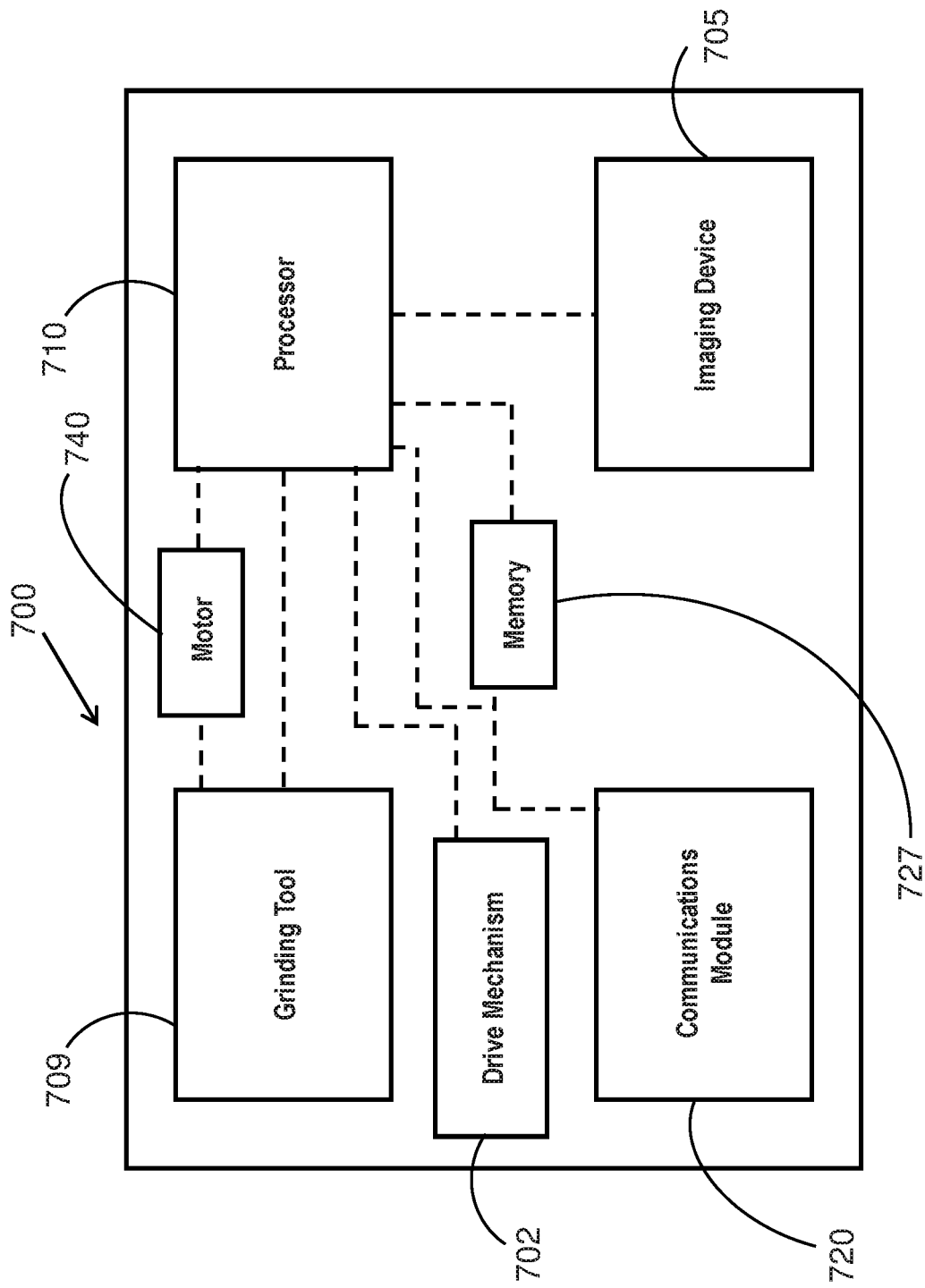

Fourth Robotic Device 700 (FIG. 11)

The fourth robotic device 700 can include an imaging device 705. The at least one imaging device 705 is similar or the same as the imaging device 205 and can be in the form of a camera and more particularly, a digital camera (e.g., CCD and CMOS). The imaging device 705 can provide a continuous digital camera stream to the operator. When positioned at one end of the main chassis of the fourth robotic device 700, the imaging device 705 looks forward into the pipe 10 as the system 100 drives within the pipe 10. The imaging device 705 is positioned such that the weld joint 20 can be viewed and more particularly, the progress of the grinding can be evaluated. A real time stream is thus provided by the imaging device 705 and can be viewed by the operator at the main computing device 130 and can also be fed to at least one on-board computer 710 that is associated with the fourth robotic device 700.

The fourth robotic device 700 has the at least one main (onboard) processor (computer) 710 (PCB) that is operatively connected to the imaging device 705, as well as other sensors and electronics described herein. The main processor 710 can be operatively connected to a communications module 720 that permits commands and data, images, video feeds, etc. to be communicated between the processor 710 and a main controller that is typically located outside the pipe string 10 and can be part of a computing device (e.g., computing device 130) that has a display on which the profile data, images, video feeds, etc. can be displayed. Memory 727 is preferably provided as part of the fourth robotic device 700.

As described herein, the fourth robotic device 700 includes a grinder (grinding tool) 709 that is configured to grind the weld in select locations that need remedial action.

The grinder 709 can be operated using a motor 740. A drive mechanism 702 is provided for controllably driving the fourth robotic device 700.

The drive mechanism 702 can consist of any number of different conventional drive mechanisms and generally includes drive wheels or continuous tracks (tank treads) that surround drive wheels. One or more motors, such as an electric motor (e.g., DC servomotor) can be used and is connected to a power source, such as a battery, that powers the motor as well as other electronics contained onboard the third robotic device 600. In this manner, the fourth robotic device 700 can be driven to a precise location within the pipe string 10. As mentioned, the fourth robotic device 700 can be tethered to the other robotic devices or they can be separate devices that are driven independent from one another.

The scanning module 605 (weld bead depth measurement and scanning tool) is configured to measure the weld dead depth autonomously using laser to estimate how deep the weld in penetrating the pipe 10. It will be understood that the weld depth must be maintained within a specific range such that the bead is neither shallow that could cause a potential leak nor too deep to block the pipeline. The scanning module 605 is configured to detect any sharp edges in the weld bead.

If the weld bead is too deep or a sharp edge is detected, a rectification job plan is prepared and then delivered to the fourth robotic device 700 and more particularly, is generated for the grinding tool (grinder) 709 including the anomaly type, depth and position. A contour path of the grinding tool 709 can be generated.

The cart locates itself autonomously such that the grinding tool 709 is in position to perform the repair. As described herein, the location of the weld is determined and recorded by the system and thus, each of the autonomous robotic devices can be driven to the precise location of the weld in order to perform the intended operations on the weld. A software simulation is generated in the user interface screen to simulate the generated contour path for the grinding tool 709 awaiting the user confirmation. Once the user confirmation is received, the grinding tool 709 autonomously starts with the repair job until completed. The imaging device 705 is installed in proximity of the grinding tool 709 to observe the progression of the grinding. Once the grinding is completed, the scanning tool 605 measures the weld wall again to check for depth and sharp protrusions. If any is detected, the above process is repeated.

It will be appreciated that one exemplary type of grinding tool 709 is disclosed in U.S. patent application Ser. No. 16/704,916, filed Dec. 5, 2019, which is hereby incorporated by reference in its entirety.

Autonomous Modules for Measuring Weld Surface Preparation and Roughness Measurement Tool The system 100 can further include a weld surface preparation module and an autonomous roughness measurement tool. Each of these tools can be embodied in individual robotic devices or can be embodied in separate robotic devices as described below. For ease of illustration, the tools are described separately. For example, the weld surface preparation module can be embodied in a fifth robotic device 800 and the roughness measurement tool can be embodied in a sixth robotic device 900. As described herein, the robotic devices can be all combined in an autonomous train. For example, a single train cart can carry both modules to perform the weld surface preparation and roughness measurement tool. The cart detects and approaches the weld autonomously and awaits user confirmation similar to the coating application described herein.

Figure 12:
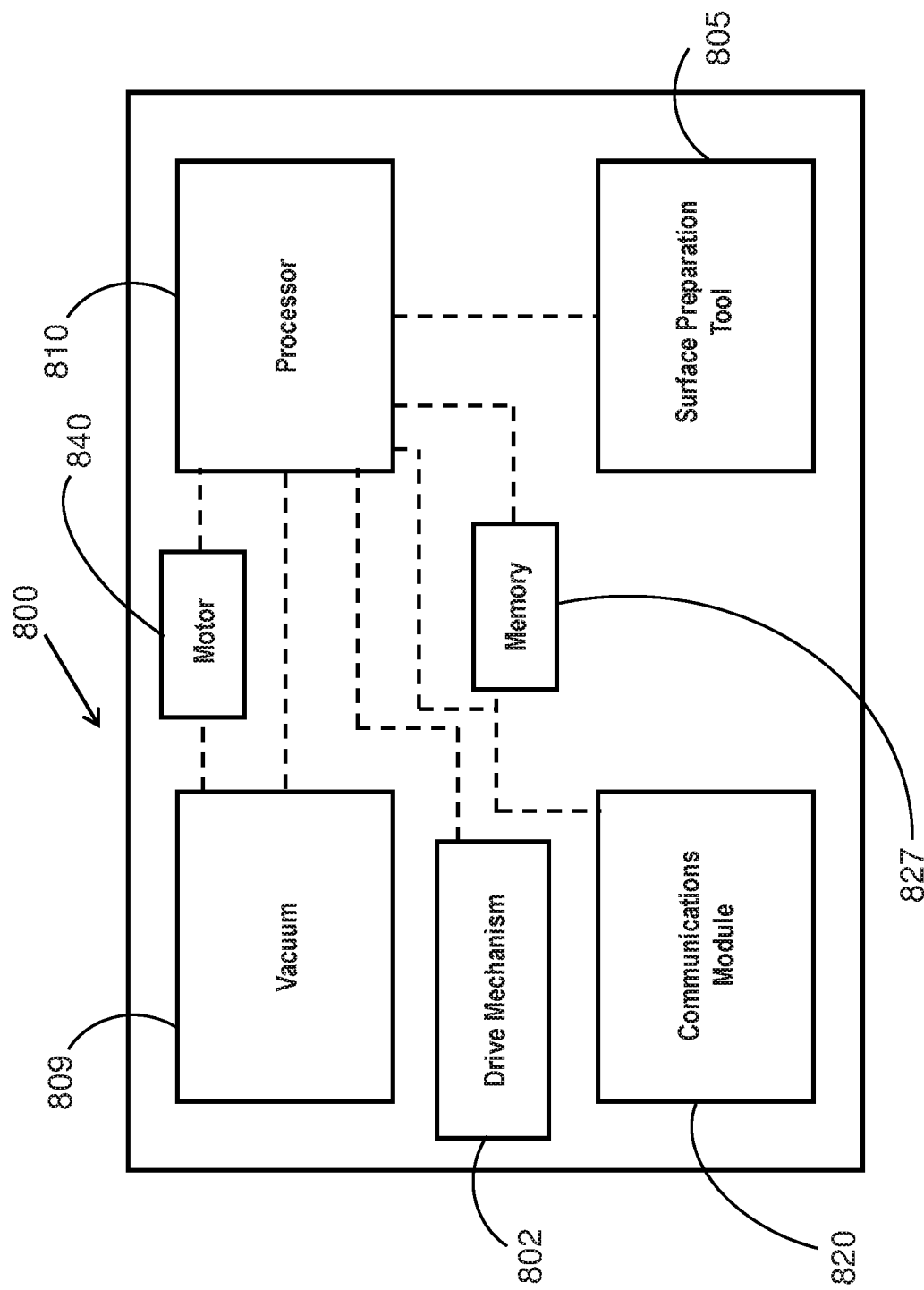

Fifth Robotic Device 800 (FIG. 12)

The fifth robotic device 800 is configured for autonomous weld surface preparation. The fifth robotic device 800 includes devices that are configured to prepare the weld surface to allow for additional operations to be performed on the weld. For example, the fifth robotic device 800 can include a surface preparation tool 805 and a vacuum 809 for use in combination with the surface preparation tool 805.

Prior to any coating application, surface preparation of the weld is required. Abrasive blast cleaning is critical to the integrity and performance of the applied field joint coating system. The process ensures the steel substrate is prepared to the required standard of cleanliness whilst providing an anchor profile for coating adhesion. The fifth robotic device 800 is thus configured to abrasively blast the weld.

In one exemplary embodiment, the fifth robotic device 800 includes the surface preparation tool 805 that can be in the form of a blaster and the complementary vacuum 809. In an alternative embodiment, the surface preparation tool 805 can be a simple roughening brush.

The operation and control over the surface preparation tool 805 and vacuum 809 can be controlled and monitored through the main computing device 130 as wells as an one on-board computer 810 that is associated with the fifth robotic device 800.

The fifth robotic device 800 has the at least one main (onboard) processor (computer) 810 (PCB) that is operatively connected to the tool 805 and vacuum 809, as well as other sensors and electronics described herein. The main processor 810 can be operatively connected to a communications module 820 that permits commands and data, images, video feeds, etc. to be communicated between the processor 810 and a main controller that is typically located outside the pipe string 10 and can be part of a computing device (e.g., computing device 130) that has a display on which the profile data, images, video feeds, etc. can be displayed. Memory 827 is preferably provided as part of the fifth robotic device 800.

A motor 840 can be provided for controlling one or more of the tool 805 and the vacuum 809.

A drive mechanism 802 can consist of any number of different conventional drive mechanisms and generally includes drive wheels or continuous tracks (tank treads) that surround drive wheels. One or more motors, such as an electric motor (e.g., DC servomotor) can be used and is connected to a power source, such as a battery, that powers the motor as well as other electronics contained onboard the fifth robotic device 800. In this manner, the fifth robotic device 800 can be driven to a precise location within the pipe string 10. As mentioned, the fifth robotic device 800 can be tethered to the other robotic devices or they can be separate devices that are driven independent from one another.

The fifth robotic device 800 can include an imaging device, such as one of the cameras described herein, can be provided for providing real-time visual feedback of the blasting process. By communicating this directly to the use (operator), the user has the option to stop the blasting process at any time due to feedback (images/video fees) from the camera.

Figure 13:
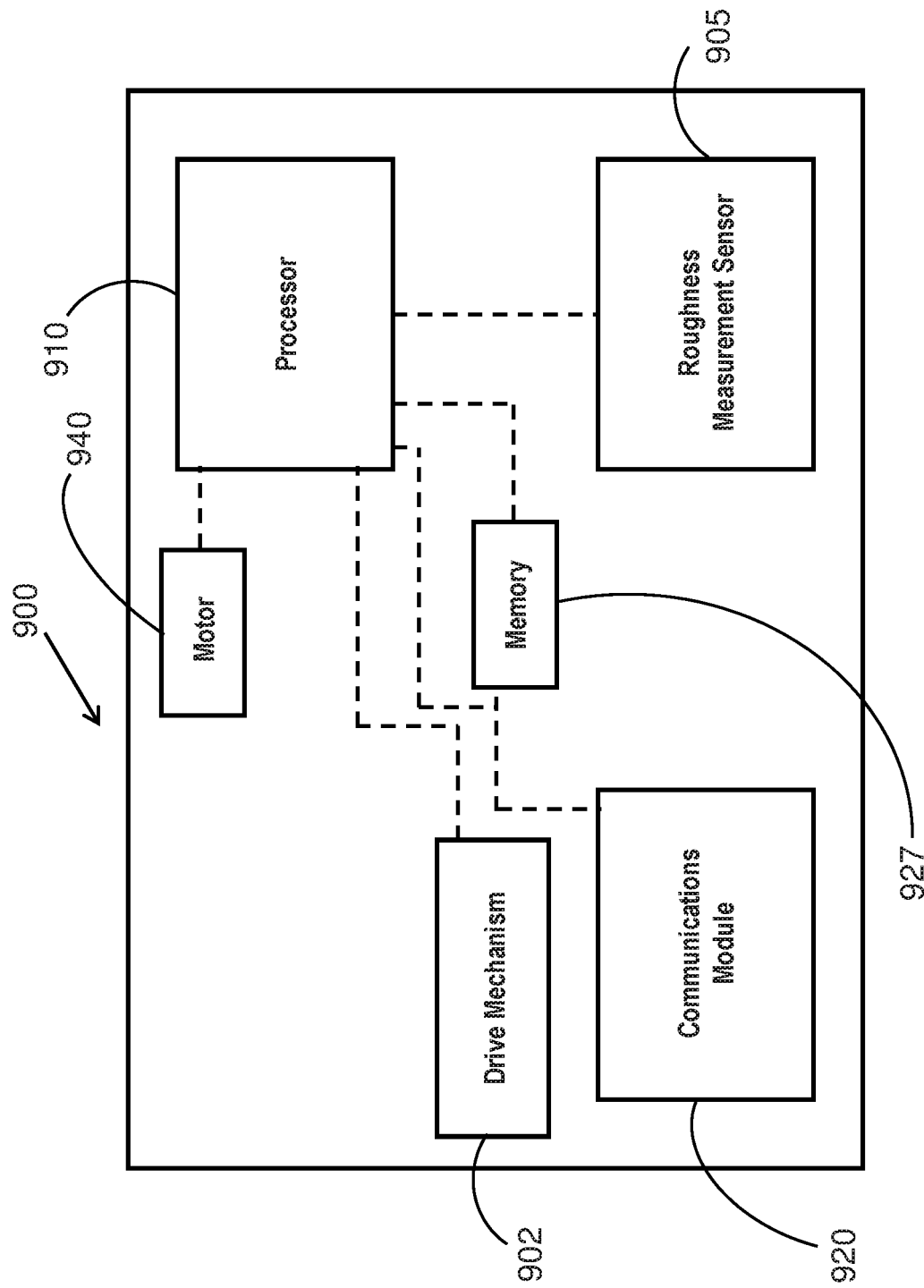

Sixth Robotic Device 900 (FIG. 13)

The sixth robotic device 900 is configured for autonomous inspection and measurement of the roughness of the weld. The sixth robotic device 900 includes roughness measurement sensor 905 that is configured to measure a roughness of the weld. Any number of surface roughness measurement tools and sensors can be used so long as they are suitable for the intended application and work site. For example, the roughness measurement sensor 905 can comprise an optical sensor and can be driven across the surface of the weld and with complementary software, the weld surface roughness (topography) can be measured. Available roughness measurement sensors can also be combined with image processing software to allow the weld roughness to be measured.

Although the desired surface profile may vary from one application to another, usually the recommended height between peaks and valleys ranges between 20 µm and 500 µm. The surface roughness can be measured using mechanical depth probes such as the Elcometer 224 or many others in the market. Additionally, LASER can be used as an alternative way of measuring the difference in height between peaks and valleys with very high precision. Another approach is to use a combination of HD optical sharp camera, computer vision and perhaps supervised machine learning to estimate the average surface profile in a specific area.

The sixth robotic device 900 has the at least one main (onboard) processor (computer) 910 (PCB) that is operatively connected to roughness measurement sensor 905, as well as other sensors and electronics described herein. The main processor 910 can be operatively connected to a communications module 920 that permits commands and data, images, video feeds, etc. to be communicated between the processor 910 and a main controller that is typically located outside the pipe string 10 and can be part of a computing device (e.g., computing device 130) that has a display on which the profile data, images, video feeds, etc. can be displayed. Memory 927 is preferably provided as part of the sixth robotic device 900.

A motor 940 can be provided for controlling the roughness measurement sensor 905 and/or other components of the sixth robotic device 900.

A drive mechanism 902 can consist of any number of different conventional drive mechanisms and generally includes drive wheels or continuous tracks (tank treads) that surround drive wheels. One or more motors, such as an electric motor (e.g., DC servomotor) can be used and is connected to a power source, such as a battery, that powers the motor as well as other electronics contained onboard the sixth robotic device 900. In this manner, the sixth robotic device 900 can be driven to a precise location within the pipe string 10. As mentioned, the sixth robotic device 900 can be tethered to the other robotic devices or they can be separate devices that are driven independent from one another.

As with the other embodiments, a single train cart can carry both modules 800, 900. The cart detects and approaches the weld autonomously and awaits user confirmation as by the user interface described herein. The surface preparation tool 805 can be a blaster and vacuum 809 to suck the blasted material. It is essential to create the required anchor profile on the surface to ensure proper bondage between the surface and the coating material prior to coating. The blasted material must be sucked or blown away of the roughened surface.

The blaster 805 is placed on top of the weld. Blasting speed and time is estimated autonomously which requires user confirmation (via the user interface) and authorization to start blasting. A visual feedback of the blasting process is provided to the user through a camera which gives the user an option to stop the blasting at any time. Once the surface is roughened, the cart autonomously to place the vacuum/blower nozzle 809 on top of the weld. The debris generated from blasting is then cleaned autonomously. Since the location of the weld is known and the area that has just been operated on by the blaster 805 is known, the area that the vacuum 809 is to be positioned and moved over is likewise known. The vacuum/blower nozzle 809 thus serves to suck up debris generated during the blasting operation and/or blow such debris.

Once the surface is roughened and cleaned, the roughness measurement sensor 905 is placed autonomously on top of the weld. Awaiting the user confirmation, the sensor 905 starts measuring the roughness of the surface. If the roughness is within a user defined acceptable range, then the job is completed. If more roughness is needed to achieve the anchor profile, the position of the area that requires further roughening is determined and sent to the surface preparation tool controller. In other words, the software is designed to analyze the measurements recorded by the sensor 905 and if one or more areas of the roughened weld surface lie outside the acceptable range, these outlier areas are flagged and a work plan is generated for the blaster 805. The blaster 805 then executes this work plan and goes back and operates on the flagged area or areas to correct the surface profile. Once the blaster 805 completes its task, then the sensor 905 again is positioned (e.g., drive over) these areas to evaluate the surface roughness of the weld. The process is then repeated until desired roughness is achieved along the weld area.

Additional details concerning the third robotic device 600 and/or the fourth robotic device 700 and/or the fifth robotic device 800 and/or the sixth robotic device 900 are found in commonly assigned U.S. patent application Ser. No. 16/654,861, filed Oct. 16, 2019, and U.S. patent application Ser. No. 16/704,916, filed Dec. 5, 2019, each of which is hereby incorporated by reference in its entirety.

It will be understood that the third robotic device 600, the second robotic device 700, the third robotic device 800 and the fourth robotic device 900 are utilized prior to the step of coating the weld using the second robotic device since these devices concern the measurement of the weld bead and the subsequent processing of it, such as grinding the weld and also surface roughness preparation utilizing a blaster and vacuum. Thus, like all of the robotic devices described herein, are autonomous and can have on-board computers that allow the individual robotic devices to communicate with one another and to travel within the pipe 10 to specific locations (weld locations) without heavy user involvement. Each individual robotic device is configured to perform one or more specific operations on the weld. When combined in succession, the robotic devices inspect and perform remedial work on the weld and then finally coat the weld.

Advantages of System 100

As previously mentioned, metallic pipelines are generally assembled in the field using girth welding techniques. This involves the welding together of abutting pipe ends from the exterior. The present disclosure sets forth a mobile robotic system that performs weld inspection, surface preparation, coating and coating inspection. Currently, this is often accomplished using trains of modules that perform subsequent functions or individual robots that perform a single function in this process, or a combination of the two. In either configuration, the robot's functionalities are mostly executed manually by a human operator. This involves visual inspection of the weld using an onboard camera, and manual alignment of the robot's position and the operated tools to perform the required task.

The system 100 includes a high degree of automation functionality that would allow for optimized deployment of the robotic systems that perform the various tasks required for coating pipes in the field. Not only would a direct labor reduction be achieved through automation, but optimal deployment would realize reductions in cost, time, and capital requirements as well as performing tasks with more precision. More specifically, instruments like a digital cameras, encoders, and proximity sensor can provide much more accurate feedback than a human eye, and when used in a control loop, they can provide an automated process control with minimal error and execution time. The system 100 thus includes a certain level of automation along with operator-robot-interaction in the in-pipe robots that perform weld joint surface preparation, coating, and coating inspection. In addition, as mentioned, the coating inspection process provides advantages over the prior art systems since it allows for not only holiday detection but also the precise location of the holiday can be calculated to allow for recoating of only the affected area and not the entire coating on the weld joint.

It will therefore be understood that the present system 100 is configured as automated in-pipe system (crawler) that travels within the pipeline and uses a vision system (imaging device(s)) or other system to detect a weld joint. Once the weld joint is detected, the system 100 positions itself relative to the detected weld joint (e.g., within a prescribed distance)

and surface preparation can optionally be performed on the weld joint. After the surface is prepared, the surface can be coated and then inspected in an automated manner. Alternatively, after weld detection, the coating at the weld joint is inspected and if an anomaly is detected, a recoat of that localized area is performed. Thus, during the coating inspection process, if an anomaly is found, the precise location of the anomaly is recorded. For example, the anomaly can be in the form of a holiday and the precise location of the holiday is recorded so as to allow only the localized area of the holiday to be recoated as opposed to recoating the entire weld joint.

It will be understood that the automation described herein can be used together as part of a multi-step operation in which, for example, the weld joint is detected and its location confirmed and logged and then, one or more of the following operations are performed: (1) holiday inspection in which the coating that covers the weld joint is inspected in an automated manner and any anomalies, such as defects, are recorded; (2) a surface preparation operation in which at least an area of the detected weld joint is operated on for preparing the area for a recoat or initial coating (3) a coating operation in which the present in-pipe system automatically positions itself relative to the weld joint and coats at least a portion of the coating; and/or (4) a coating inspection after the coating operation has been performed to confirm the integrity of the recoated area after the coating has sufficiently dried.

It will be appreciated that any or all of the above-identified tasks (1) to (4) can be performed with the automated system 100 that is described herein. For example, the system 100 is initially configured to travel within the pipe string (pipeline) 10 and then detect the weld joint 20 in an automated manner. The location of the weld joint is recorded and the user, through a graphical user interface, is preferably provided with visual feedback, such as a live image or still image, of the weld joint itself and then can confirm, through the graphical user interface, that the weld joint has been properly detected and identified. Once the weld joint is approved by the user, the system automatically moves to a target position which is a position at which at least one operation or task can be performed, such as one or more of the tasks (1) to (4). This step is automated and then, the at least one operation or task automatically begins on the weld joint. Since, as described herein, the position of the system can be calculated, the distance to the weld joint is likewise able to be calculated. The target position is thus a position at which the system is positioned a prescribed (predefined/preprogrammed) distance from the weld joint. The prescribed distance can depend on which robotic device of the system is being positioned since it may be based on construction of the robotic device and location of the operating tools that one robotic device will need to be one distance from the weld joint and another robotic device will need to be another distance from the weld joint.

One of the other advantages of the present system is the precise calculation of the holiday angle using encoders as a feedback sensor to automate holiday detection process and provide precise angle measurement. These angle measurements are stored on the onboard embedded computer to be used in automating the subsequent coating process. In other words, once the holiday angle is recorded, this recorded information is then used to position the coating nozzle at the location that the holiday has been detected (one the coating module (robotic device) has been positioned relative to the weld joint). Using this technology, in addition to a positioning (distance) system described herein, the precise location of the system 100 and each of its components can be determined relative to the weld joint. For example, the present disclosure describes the use of both wheel encoders, or a proximity sensor, e.g., 1D LIDAR, and the fusion of both sensor measurements to provide precise location information regarding the position of the system 100.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. An automated system for performing multiple operations on one or more weld joints of a pipe string that are detected by the automated system, the automated system comprising:

a first robotic device that is configured to controllably travel inside of the pipe string and detect and uniquely identify each weld joint within the pipe string, the first robotic device including an automated coating nozzle that is configured to coat one or more weld joints of the pipe string, the automated coating nozzle being operatively coupled to a first position detection mechanism for detecting a position of the automated coating nozzle, wherein the automated coating nozzle is coupled to the first robotic device such that the automated coating nozzle can independently rotate relative to the first robotic device; a second robotic device that is configured to controllably travel inside of the pipe string and includes an automated coating inspection tool for inspecting the coating on the weld joint, the automated coating inspection tool having a second position detection mechanism for detecting a position of the coating inspection tool, thereby allowing a location of an anomaly in the coating to be determined; and a main controller for controlling movement of the automated system and for positioning the automated coating nozzle based on position measurements from the second position detection mechanism at a location that allows localized recoating of the anomaly contained in the coating;

a distance sensor that is carried by the second robotic device and configured to calculate an axial position of the second robotic device within the pipe string, wherein the distance sensor comprises a light detection and ranging (LIDAR) device that is positioned to emit a laser beam in a longitudinal direction of the pipe string and calculate a traveled longitudinal distance based on measured reflections caused by a reflective element that is positioned at an entrance of the pipe string and positioned at least partially within the inside of the pipe string such that the laser beam that is projected longitudinally within the pipe string strikes the reflective element.

2. The automated system of claim 1, wherein the first robotic device comprises a first crawler and the second robotic device comprises a second crawler each of which is configured to travel within the pipe string.

3. The automated system of claim 2, wherein second crawler is operatively coupled to the first robotic device, the second robotic device includes a plurality of wheels on which the second robotic device is driven.

4. The automated system of claim 3, wherein the second robotic device further includes a third position detection mechanism for detecting a position of the second robotic device, the third position detection mechanism being in the form of one or more third encoders that are associated with one or more axles of the plurality of wheels of the second robotic device for determining angular displacement of the one or more axles, thereby allowing a distance that the second robotic device has traveled within the pipe string to be determined and allowing the main controller to calculate an axial position of the second robotic device within the pipe string.

5. The automated system of claim 1, wherein the first robotic device includes a first vision system configured to provide images and/or a live video feed of inside the pipe string and the first position detection mechanism includes a first encoder that is part of a first motor connected to the automated coating nozzle, the first encoder allowing for an angular position of the automated coating nozzle to be determined.

6. The automated system of claim 5, wherein the first encoder comprises a rotary encoder in the form of an electro-mechanical device that converts a regular position or motion of a first shaft of the first motor to analog or digital output signals, the automated coating nozzle being fixedly attached to the first shaft.

7. The automated system of claim 5, wherein the angular position of the automated coating nozzle comprises a deployment angle of the automated coating nozzle.

8. The automated system of claim 5, wherein the second robotic device includes a second vision system configured to provide images and/or a live video feed of inside the pipe string and the second position detection mechanism includes a second encoder that is part of a second motor connected to the coating inspection tool, the second encoder allowing for an angular position of the coating inspection tool to be determined.

9. The automated system of claim 8, wherein the second encoder comprises a rotary encoder in the form of an electro-mechanical device that converts a regular position or motion of a second shaft of the second motor to analog or digital output signals, the coating inspection tool being fixedly attached to the second shaft.

10. The automated system of claim 8, wherein the angular position of the coating inspection tool comprises a deployment angle of the coating inspection tool.

11. The automated system of claim 1, wherein the reflective element comprises a reflective sheet or panel that is hanging at the entrance of the pipe and covers a part of the entrance of the pipe string.

12. The automated system of claim 1, wherein the coating inspection tool comprises a flat brush.

13. The automated system of claim 1, wherein the main controller is located at a remote location outside the pipe string.

14. The automated system of claim 1, wherein the main controller includes a weld joint detection module that is configured to process one or more images received from a vision system that is part of one of the first robotic device and the second robotic device for detecting a location of one or more weld joints along the pipe string.

15. The automated system of claim 14, wherein the main controller includes a graphical user interface including a display on which the one or more images are displayed for allowing a user to analyze and review and confirm proper detection of the weld joint.

16. The automated system of claim 15, wherein the weld joint detection module is configured to continuously overlay a detected weld perimeter on the one or more weld images which are displayed on the display, wherein the weld joint detection module is configured to calculate an estimated normal distance from the detected weld joint.

17. The automated system of claim 14, wherein the weld joint detection module is configured to overlay a marker over one image for identifying a location of the weld joint.

18. The automated system of claim 17, wherein the marker comprises a visual identifier that has a contrasting color that is different than a surrounding environment in the image for clearly identifying the location of the weld joint.

19. The automated system of claim 1, further comprising a surface preparation tool that is configured to prepare a surface of each weld joint prior to coating the weld joint.

20. The automated system of claim 19, wherein the surface preparation tool comprises a grit blaster and vacuum.

* * * * *